(12) United States Patent
Shah et al.

(10) Patent No.: US 10,977,618 B2
(45) Date of Patent: Apr. 13, 2021

(54) SYSTEM AND METHOD FOR MANAGEMENT OF WORKFLOW CONFIGURATIONS

(71) Applicant: Tata Consultancy Services Limited, Mumbai (IN)

(72) Inventors: Viral Prakash Shah, Mumbai (IN); Shobhit Shukla, Mumbai (IN); Ikshita Jain, Mumbai (IN); Meenal Keshore, Mumbai (IN); Ramprasad Dhakad, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 997 days.

(21) Appl. No.: 15/287,143

(22) Filed: Oct. 6, 2016

(65) Prior Publication Data

US 2017/0344951 A1 Nov. 30, 2017

(30) Foreign Application Priority Data

May 30, 2016 (IN) .............................. 201621018582

(51) Int. Cl.
*G06Q 10/06* (2012.01)
*G06Q 10/10* (2012.01)
*G06F 16/23* (2019.01)
*G06Q 40/06* (2012.01)

(52) U.S. Cl.
CPC ....... *G06Q 10/103* (2013.01); *G06F 16/2379* (2019.01); *G06Q 10/06* (2013.01); *G06Q 10/0633* (2013.01); *G06Q 40/06* (2013.01)

(58) Field of Classification Search
CPC .............................. G06Q 10/06; G06Q 10/10
USPC .......................................................... 705/7.27
See application file for complete search history.

(56) References Cited

U.S. PATENT DOCUMENTS

| | | | |
|---|---|---|---|
| 7,399,210 | B2 | 7/2008 | Yoshimasa |
| 7,721,303 | B2 * | 5/2010 | Alves de Moura ....... G06F 8/38 719/328 |
| 7,953,758 | B2 | 5/2011 | Takatsu et al. |
| 2007/0016465 | A1 | 1/2007 | Schaad |
| 2007/0174342 | A1 | 7/2007 | Maeda et al. |
| 2008/0313491 | A1 | 12/2008 | Adams, Jr. et al. |
| 2009/0240553 | A1 | 9/2009 | Sato |
| 2011/0145037 | A1 | 6/2011 | Domashchenko et al. |

(Continued)

*Primary Examiner* — Nga B Nguyen
(74) *Attorney, Agent, or Firm* — Finnegan, Henderson, Farabow, Garrett & Dunner LLP

(57) ABSTRACT

A technique for management of workflow configurations is disclosed. In an embodiment, an update in a workflow configuration is received. Further, a list of transactions in a workflow at multiple levels are fetched upon receiving the update in the workflow configuration, the workflow includes the list of transactions and a list of stakeholders associated with the list of transactions. Furthermore, a plurality of clauses at each of the multiple levels are executed to determine a set of eligible stakeholders for performing the list of transactions and corresponding actions. Each of the plurality of clauses are decision control points configured at each of the multiple levels. Moreover, the list of stakeholders and corresponding actions for each of the list of transactions at the multiple levels are dynamically updated based on the set of eligible stakeholders for performing the list of transactions and corresponding actions.

16 Claims, 2 Drawing Sheets

(56) References Cited

U.S. PATENT DOCUMENTS

| | | |
|---|---|---|
| 2011/0191217 A1* | 8/2011 | Saiu ................... G06Q 10/103 705/32 |
| 2012/0227044 A1 | 9/2012 | Arumugharn et al. |
| 2013/0179208 A1 | 7/2013 | Chung et al. |
| 2014/0006078 A1 | 1/2014 | McGauley et al. |
| 2015/0242264 A1 | 8/2015 | Vibhor et al. |
| 2017/0236084 A1* | 8/2017 | Sullivan ................. H04L 67/10 705/7.26 |

* cited by examiner

US 10,977,618 B2

SYSTEM AND METHOD FOR MANAGEMENT OF WORKFLOW CONFIGURATIONS

PRIORITY CLAIM

This U.S. patent application claims priority under 35 U.S.C. § 119 to: India Application No. 201621018582, filed on May 30, 2016. The entire contents of the aforementioned application are incorporated herein by reference.

TECHNICAL FIELD

The embodiments herein generally relate to workflow configurations and, more particularly, to management of workflow configurations.

BACKGROUND

Generally, workflows are computer-implemented representations of real world processes. Workflows assist users with collaboration on documents and management of project tasks by implementing specific business processes on documents and items. Among other cases, workflows also assist organizations with adherence to consistent business processes, and improve organizational efficiency and productivity by managing the tasks and steps involved in specific business processes.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below. In view of the foregoing, an embodiment herein provides a technique for management of workflow configurations is disclosed.

In one aspect, a computer-implemented method for management of workflow configurations is disclosed. In this aspect, an update in a workflow configuration is received. Further, a list of transactions in a workflow at multiple levels are fetched upon receiving the update in the workflow configuration. For example, the workflow includes the list of transactions at the multiple levels and a list of stakeholders associated with the list of transactions. Furthermore, a plurality of clauses at each of the multiple levels are executed to determine a set of eligible stakeholders for performing the list of transactions and corresponding actions. Each of the plurality of clauses are decision control points configured at each of the multiple levels. Moreover, the list of stakeholders and corresponding actions for each of the list of transactions at the multiple levels are dynamically updated based on the set of eligible stakeholders for performing the list of transactions and corresponding actions.

In another aspect, a system for management of workflow configurations is disclosed. In an example, the system includes one or more processors and a memory communicatively coupled to the processors. Further, the memory includes a workflow management module. In an example implementation, the workflow management module receives an update in a workflow configuration. Further, the workflow management module fetches a list of transactions in a workflow at multiple levels upon receiving the update in the workflow configuration. For example, the workflow includes the list of transactions at the multiple levels and a list of stakeholders associated with the list of transactions. Furthermore, the workflow management module executes a plurality of clauses at each of the multiple levels to determine a set of eligible stakeholders for performing the list of transactions and corresponding actions. Each of the plurality of clauses are decision control points configured at each of the multiple levels. Moreover, the workflow management module dynamically updates the list of stakeholders and corresponding actions for each of the list of transactions at the multiple levels based on the set of eligible stakeholders for performing the list of transactions and corresponding actions.

It should be appreciated by those skilled in the art that any block diagram herein represent conceptual views of illustrative systems embodying the principles of the present subject matter. Similarly, it is appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein are better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
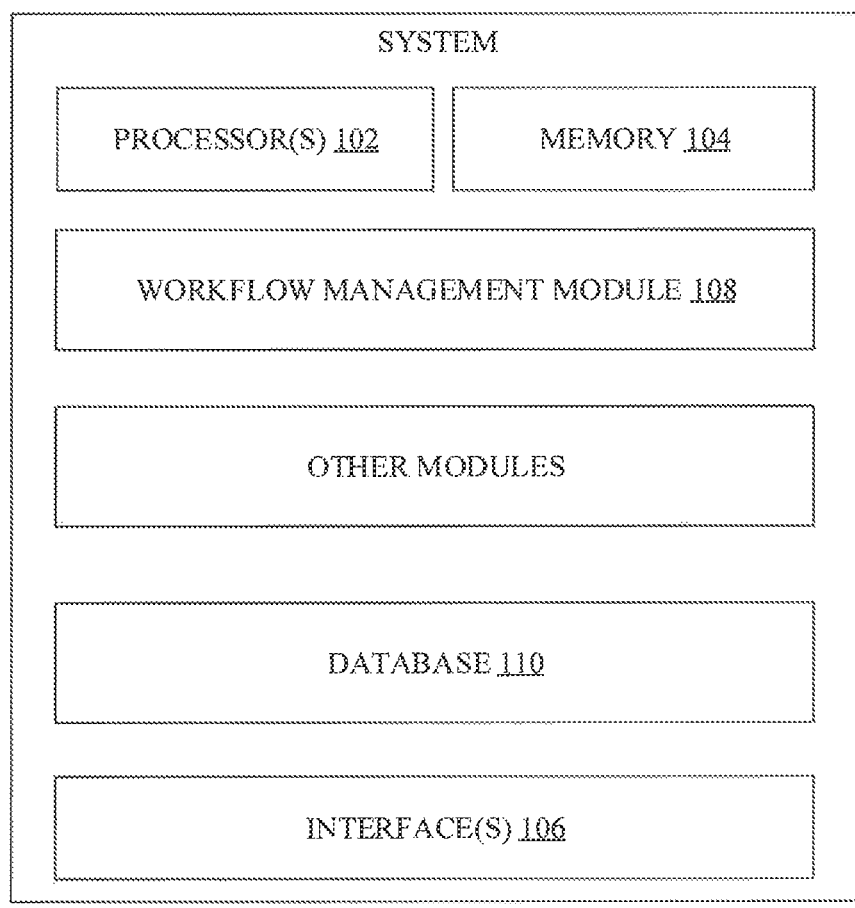
FIG. 1 illustrates a block diagram of a system for management of workflow configurations, according to an embodiment of the present disclosure.

FIG. 1 illustrates a system for management of workflow configurations, according to an embodiment of the present disclosure. As shown in FIG. 1, the system 100 includes one or more processor(s) 102 and a memory 104 communicatively coupled to each other. The system 100 also includes interface(s) 106. Further, the memory 104 includes a workflow management module 108 and other modules. Furthermore, the memory 104 includes a database 110. Although FIG. 1 shows example components of the system 100, in other implementations, the system 100 may contain fewer components, additional components, different components, or differently arranged components than depicted in FIG. 1.

The processor(s) 102 and the memory 104 may be communicatively coupled by a system bus. The processor(s) 102 may include circuitry implementing, among others, audio and logic functions associated with the communication. The processor(s) 102 may include, among other things, a clock, an arithmetic logic unit (ALU) and logic gates configured to support operation of the processor(s) 102. The processor(s) 102 can be a single processing unit or a number of units, all of which include multiple computing units. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions and data stored in the memory 104.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 106 may include a variety of software and hardware interfaces, for example, interfaces for peripheral device(s), such as a keyboard, a mouse, an external memory, and a printer. The interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 106 may include one or more ports for connecting the system 100 to other devices or systems.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 104, may store any number of pieces of information, and data, used by the system 100 to implement the functions of the system 100. The memory 104 may be configured to store information, data, applications, instructions or the like for enabling the system 100 to carry out various functions in accordance with various example embodiments. Additionally or alternatively, the memory 104 may be configured to store instructions which when executed by the processor(s) 102 causes the system 100 to behave in a manner as described in various embodiments. The memory 104 includes the workflow management module 108 and other modules. The module 108 and other modules include routines, programs, objects, components, data structures, etc., which perform particular tasks or implement particular abstract data types. The other modules may include programs or coded instructions that supplement applications and functions of the system 100.

In operation, the workflow management module 108 receives an update in a workflow configuration. For example, the update may be an update in a transaction, addition of a stakeholder, deletion of a stakeholder and so on. Further, the workflow management module 108 fetches a list of transactions in a workflow at multiple levels upon receiving the update in the workflow configuration. For example, the workflow includes the list of transactions at the multiple levels and a list of stakeholders associated with the list of transactions. In an embodiment, the workflow management module 108 fetches the list of transactions in the workflow at the multiple levels from a workflow table in the database 110 using a hash map upon receiving the update in the workflow configuration. A HashMap contains values based on the key. The HashMap implements the Map interface and extends AbstractMap class. For example, the workflow table includes information about transactions, levels, clauses, stakeholders and so on. Also, the workflow table is involved for showing the transactions in a work list of stakeholders, showing history of a transaction to a stakeholder, and storing details of a transaction such as a next level, status, date when the transaction was created, date when transaction was updated, action taken by and so on. In an example scenario, if there is any change in the workflow configuration after the transactions are created, the workflow management module 108 flows new transactions and corrects the older transactions as per the updated workflow configuration. Further, the workflow management module 108 initiates a refresh so that a list of transactions that have been created before workflow configuration changes have been done are fetched. For these transactions, older data from workflow tables are deleted.

Furthermore, the workflow management module 108 executes a plurality of clauses at each of the multiple levels to determine a set of eligible stakeholders for performing the list of transactions and corresponding actions. Each of the plurality of clauses are decision control points configured at each of the multiple levels. Thus, enabling multiple flows configuration to be done at levels in the workflow. In an example implementation, the workflow management module 108 creates mapping of the multiple levels in the workflow. Further, the workflow management module 108 captures details, such as Name, Forward Level (next level), Go Back Level (previous level), Is Initial Level, Work list Task and so on. The Forward Level and Go Back level are other levels created in workflow and the workflow management module 108 gets the details of what the Forward Level or Go Back Level is for the configured workflow. For example, the workflow management module 108 uses the Forward or Go Back level configured at level configurations for transition (also known as a mandatory condition) or the workflow management module 108 uses the Forward or Go back level defined at a clause configuration (also known as mutually exclusive condition). The clause configuration may be defined on basis of conditions which are configured at a clause. At each level, the workflow management module 108 can define "n" number of clauses (i.e., the plurality of clauses). In an embodiment, the workflow management module 108 enables the user to define the clauses at each level. At each clause, the workflow management module 108 maps a status which indicates actions that can be performed on the workflow. For example, the status can be added by specifying a name, description, to be status for a workflow history), action transition (Forward or Go Back level), an order of status (i.e. order in which the button is displayed on solution screen) a solution status (code specific to a solution) and so on.

Further, the workflow management module 108 configures various clause details that can be configured at a given level. The workflow management module 108 then maps the actions created and maintains the mapping of the clause configured at each level and of actions mapped to various clauses. Based on a clause type (i.e., mutually exclusive or mandatory), the workflow management module 108 controls the flow of the workflow transition. For example, the mutually exclusive type defines that the flow is controlled by Forward or Go Back level configured at clause level and the mandatory type defines the flow to be controlled by level configurations only. Also, the workflow management module 108 maps each Clause with permissions. The permissions are unique identities (ids) generated and given names to which can be mapped to clause in the workflow. The permission are used to define the set of entities who are capable of performing action at the clause. For each clause, there are permissions which are given to a business logic (Role class). A role is a code based business logic which on execution provides user ids for entities (i.e., transaction ids) who can perform action on the clause. The workflow management module 108 checks the permission mapped to the clause and from permissions fetched gets the role class and user group details to get the entity ids for performing tasks. The user group is a set of entities (e.g., entities in a user group include a list of stakeholders and the user group includes ids of the stakeholders) which can be created to be mapped with a clause, controlling the authenticity of workflow by deciding stake holders of the workflow. For example, entities include Leave, Loan, Transport and so on.

In an example implementation, at each level from various clauses, the workflow management module 108 can choose to decide the clauses that are to be executed using a precondition. For example, the precondition is a business logic which on execution provides authorization of clause being executed. The precondition can be a Java class or web service or Database procedure which can be fired to check a condition. The workflow management module 108 while deciding the transition computes the precondition which in turn decides which clause should be executed and which should be omitted for concluding the transition flow of workflow. This assists in not changing the entire workflow every time a business requirement is altered or added. Therefore, any change in a business requirement require only setting up the rules and coded classes to control the further flow or change the existing flow. Thus making the workflow management module 108 most dynamic configurator.

Further, the workflow management module 108 evaluates the various details of the clause such as permissions, user groups mapped, roles configured, and determines a list of entities to perform task on that level. The workflow management module 108 also fetches the status which adds to the list of entities the actions that can be taken by the entities. Thus ensuring that each authentic entity is taking the action which the entity is supposed to take, thus controlling the actions possible to the level of entities. The entities and status mapped to the entities who are fetched as set of stakeholders of those transactions are stored in a workflow table, in the database 110, which creates the work list of the stakeholders. Also, the clauses mapped to the status is stored in the workflow table and at each clause entities (user ids) are tagged via the user group and roles which are fetched as the set of stakeholders of the transactions, which create the work list.

Moreover, the workflow management module 108 dynamically updates the list of stakeholders and corresponding actions for each of the list of transactions at the multiple levels based on the set of stakeholders who are eligible for performing the list of transactions and corresponding actions. All the stakeholders can see the transaction details, action to be taken on those transactions. Also, the workflow management module 108 populates each of the list of transactions with the dynamically updated stakeholders. The history of actions performed on a transaction can also be obtained by the updated stakeholders from the database 110. In some embodiments, the workflow management module 108 automatically updates a work list of the updated stakeholders with the actions to be performed for each of the list of transactions at each of the multiple levels. On every action taken by the stakeholders, the workflow management module 108 evaluates the next level, clause configured, permissions and another set of stakeholders. Details of current transaction are stored by the workflow management module 108 in the database 110 and the entire history of actions is maintained thus providing the feature to end user to view the workflow history of the transaction. On completion of the transaction flow, level is marked as 0 in the work list table, the work list table is emptied for that transaction thus ensuring, the transaction is no longer active, however, the details are still maintained by the workflow management module 108 for further viewing or analyzing data or process.

In some embodiments, the workflow management module 108 initiates transaction and saves the transaction related data such as entity id (i.e., transaction id), entity Type Id (i.e., either leave, loan and so on), user id of who initiated the transaction, status, org Id (i.e., id of an organization), application Id (i.e., unique Id generated for application).

In an example embodiment, on any action being taken as part of the workflow, the workflow management module 108 sends notifications to the stakeholders of the workflow. The notifications sent as part of workflow may include messages, reminders, alerts, escalations, add on communications and so on. The messages may include transaction details, actions for the stakeholders and can be sent to some or all of the stakeholders of the workflow. The workflow management module 108 send the messages to the stakeholders whenever there is some action taken on the workflow, thus informing the stakeholders of the flow and the changing actions at all levels. The actions are stored by the workflow management module 108 once the transition details are stored. Further, the workflow management module 108 provides the provision of sending reminders and alerts for various clauses in the workflow. The workflow management module 108 maps reminders and alerts to clauses, thus giving the flexibility of sending such notifications based on only clauses and not on entire workflow. The workflow management module 108 checks reminders or alerts configurations mapped to clauses and based on all clause based configurations fetched, workflow management module 108 computes the transactions for which such notifications are to be sent. Based on the configurations fetched, the workflow management module 108 evaluates and executes the clause to level mapping. Also, the workflow management module 108 checks the reminders/alerts configurations which have been mapped to the clauses and the clauses are taken as input to get the levels mapped to the clauses in the workflow. The levels further are taken as input, by the workflow management module 108, for fetching the transactions present at the fetched level and sending notifications for all the transactions.

The workflow management module 108 evaluates a start time of the transaction, a clause time execution and checks if the time defined has been completed post transaction initiation time. If the last workflow update date is equal or after the reminders start date or time (based on a frequency unit i.e., Day/Hour), the workflow management module 108 sets the reminders to true for sending. The workflow management module 108 then fetches a frequency at which the reminder is to be send and send the reminders. While sending the reminders, the workflow management module 108 checks the permission tagged to clauses and for each permission, the workflow management module 108 determines a user group or business logic written in role class to get the user Ids to which reminders at various clauses configured to various levels are to be sent.

Further, the workflow management module 108 removes the reminder start time from the clause execution time and for the remaining time, the workflow management module 108 checks if there is any alert configuration mapped. If so, the workflow management module 108 then sends alerts till clause time execution from reminder end time. Also, the workflow management module 108 fetches a clauses per level from workflow tables to get the levels at which alerts are to be sent. Based on the level details, the workflow management module 108 determines all the transactions lying at the levels and send alerts for the fetched entities. In an example, the workflow management module 108 maintains a frequency of sending alert notifications.

In addition, the workflow management module 108 configures escalation and stores configuration details in the workflow table. The workflow management module 108 then maps the configuration to the levels of the workflow. The levels configured provides the list of entities for which escalations are to be sent. For the list of entities generated, the workflow management module 108 computes an escalation logic based on the configurations created for the given workflow. If the type of escalation configured is escalation to users, the workflow management module 108 fetches a list of stakeholders who is getting escalations. In this case, the workflow management module 108 executes a user group and role classes mapped to the given permission. The role class is a java class which on execution gives ids of stakeholders and user groups are group names which have certain users tagged. These groups are executed to get the ids of users. The escalation notification also contains the details of stakeholders with whom the transaction is pending. Thus, notifying the user to which escalation is to be sent of inactivity at stakeholder level. This provides transparency of work being performed in an organization, with all the stakeholders informed of the actions of a transaction.

If the type of escalation configured is an auto escalation, the workflow management module 108 then captures details for taking action on transaction such as precondition to provide which clause to be executed, actions on the clause and what action to be taken. The workflow management module 108 then uses the details to compute the action and perform the action for that escalation. Thus ensuring that for such transactions on which timely action is mandatory should not be left unattended.

Also, the workflow management module 108 configures add on communication for each of the levels. Based on the levels and add on configuration, the workflow management module 108 computes a user group to which the notifications are supposed to be sent and send the notifications. The user group may include users of an organization and/or some external users who are not part of the workflow. Thus providing transparency within the organization, or notifying the third party owners who are not part of workflow but needs notification of the workflow.

Figure 2:
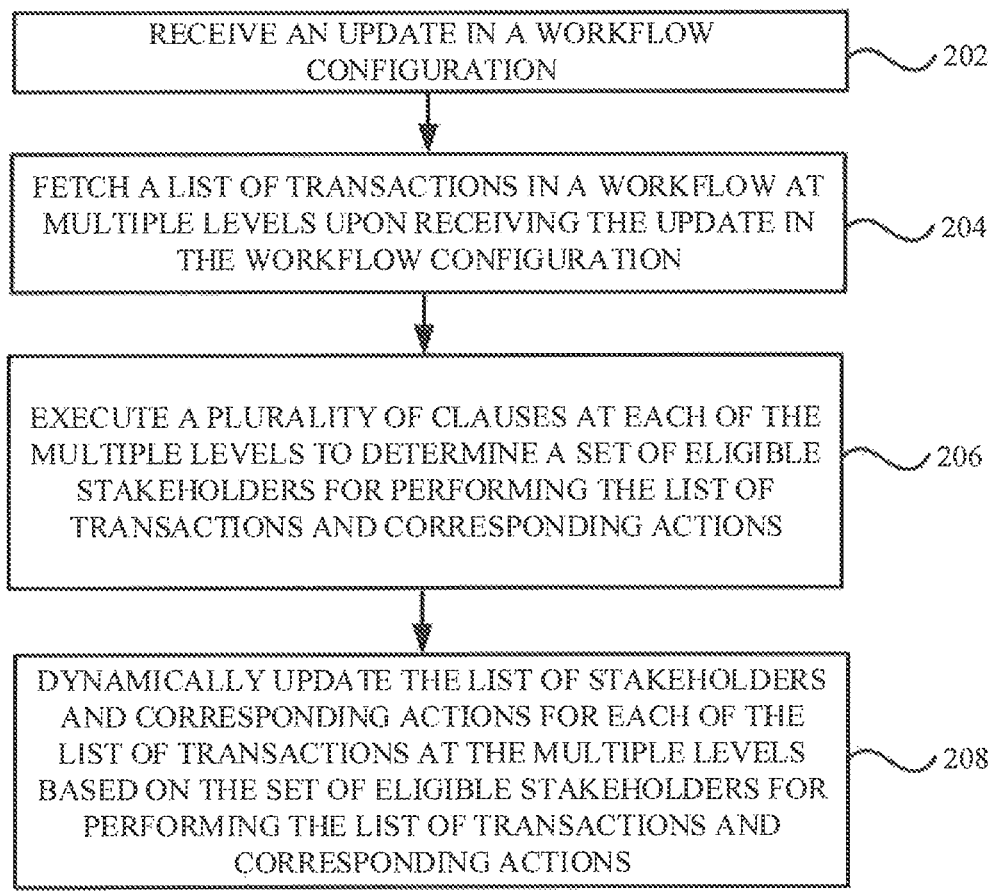
FIG. 2 is a flow chart illustrating a computer-implemented method for management of workflow configurations, according to an embodiment of the present disclosure.

FIG. 2 is a flow chart illustrating a computer-implemented method 200 for management of workflow configurations, according to an embodiment of the present disclosure. At block 202, an update in a workflow configuration is received. For example, the update includes addition of a stakeholder, deletion of a stakeholder and so on. At block 204, a list of transactions in a workflow at multiple levels are fetched upon receiving the update in the workflow configuration. For example, the workflow includes the list of transactions at the multiple levels and a list of stakeholders associated with the list of transactions. In an example, the list of transactions in the workflow at the multiple levels are fetched from a workflow table using a hash map upon receiving the update in the workflow configuration.

At block 206, a plurality of clauses at each of the multiple levels are executed to determine a set of eligible stakeholders for performing the list of transactions and corresponding actions. Each of the plurality of clauses are decision control points configured at each of the multiple levels. In an example implementation, the plurality of clauses configured at each of the multiple levels are fetched from a workflow table. Further, a precondition for each of the plurality of clauses is executed, the precondition is a condition of whether each of the plurality of clauses is to be executed or not to compute the workflow next level. Furthermore, a clause that is to be executed from the plurality of clauses is determined upon executing the precondition. In addition, the set of stakeholders tagged to the determined clause is determined. The set of stakeholders comprises a group of user identities and the user identities are involved stakeholders based on the received update. In some embodiments, each of the list of transactions is populated with the dynamically updated stakeholders.

At block 208, the list of stakeholders and corresponding actions for each of the list of transactions at the multiple levels are dynamically updated based on the set of eligible stakeholders for performing the list of transactions and corresponding actions. The set of stakeholders may include new or old stakeholders. In some embodiments, a work list of the updated stakeholders are automatically updated with the actions to be performed for each of the list of transactions at each of the multiple levels. The actions to be taken can be refreshed if there is any change in transaction or workflow. Further, the updated stakeholders are alerted with the actions to be performed on each of the list of transactions. This is explained in more detail with reference to FIG. 1.

The order in which the method(s) are described is not intended to be construed as a limitation, and any number of the described method blocks can be combined in any order to implement the above method, or an alternative method. Additionally, individual blocks may be deleted from the methods without departing from the spirit and scope of the subject matter described herein. Furthermore, the above method can be implemented in any suitable hardware, software, firmware, or combination thereof.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

What is claimed is:

1. A computer-implemented method for dynamically managing workflow configurations comprising:
   receiving an update in at least one workflow configuration from a number of workflow configurations associated with an organization;
   fetching a list of transactions in the at least one workflow at multiple levels upon receiving the update in the workflow configuration, wherein the workflow comprises the list of transactions at the multiple levels and a list of stakeholders associated with the list of transactions;
   executing a plurality of clauses at each of the multiple levels to determine a set of eligible stakeholders for performing the list of transactions and corresponding actions, wherein each of the plurality of clauses are decision control points configured at each of the multiple levels wherein a configuration of each clause is defined based on a pre-condition configured at the clause, wherein executing the plurality of clauses at each of the multiple levels comprises:
      fetching the plurality of clauses configured at each of the multiple levels from a workflow table;
      executing the precondition for each of the plurality of clauses, wherein the precondition is a condition to decide whether each of the plurality of clauses is to be executed or not to compute next level of the workflow;
      determining a clause to be executed from the plurality of clauses upon executing the precondition; and
      determining a set of stakeholders tagged to the determined clause, wherein the set of stakeholders comprises a group of user identities and wherein the user identities are involved stakeholders based on the received update, wherein the configuration of the plurality of clauses based on the precondition configured at each of the clause enables dynamic configuration of the workflow based on the update without changing entire workflow; and
   dynamically updating the list of stakeholders and corresponding actions for each of the list of transactions at the multiple levels based on the set of eligible stakeholders for performing the list of transactions and corresponding actions, thereby managing the number of workflow configurations associated with the organization by dynamically configuring the workflow configurations based on the update.

2. The method as claimed in claim 1, further comprising: automatically updating a work list of the updated stakeholders with the actions to be performed for each of the list of transactions at each of the multiple levels.

3. The method as claimed in claim 1, further comprising: populating each of the list of transactions with the dynamically updated stakeholders.

4. The method as claimed in claim 1, wherein the list of transactions in the workflow at the multiple levels are fetched from a workflow table using a hash map upon receiving the update in the workflow configuration.

5. The method as claimed in claim 1, further comprising: alerting the updated stakeholders with the actions to be performed on each of the list of transactions.

6. A system for dynamically managing workflow configurations, the system comprising:
   at least one processor; and
   a memory communicatively coupled to the at least one processor, wherein the memory comprises a workflow management module to:
      receive an update in at least one workflow configuration from a number of workflow configurations associated with an organization;
      fetch a list of transactions in the at least one workflow at multiple levels upon receiving the update in the workflow configuration, wherein the workflow comprises the list of transactions at the multiple levels and a list of stakeholders associated with the list of transactions;
      execute a plurality of clauses at each of the multiple levels to determine a set of eligible stakeholders for performing the list of transactions and corresponding actions, wherein each of the plurality of clauses are decision control points configured at each of the multiple levels wherein a configuration of each clause is defined based on a pre-condition configured at the clause, wherein executing the plurality of clauses at each of the multiple levels comprises:
         fetching the plurality of clauses configured at each of the multiple levels from a workflow table;
         executing the precondition for each of the plurality of clauses, wherein the precondition is a condition to decide whether each of the plurality of clauses is to be executed or not to compute next level of the workflow;
         determining a clause to be executed from the plurality of clauses upon executing the precondition; and
         determining a set of stakeholders tagged to the determined clause, wherein the set of stakeholders comprises a group of user identities and wherein the user identities are involved stakeholders based on the received update, wherein the configuration of the plurality of clauses based on the precondition configured at each of the clause enables dynamic configuration of the workflow based on the update without changing entire workflow; and
      dynamically update the list of stakeholders and corresponding actions for each of the list of transactions at the multiple levels based on the set of eligible stakeholders for performing the list of transactions and corresponding actions, thereby manage the number of workflow configurations associated with the organization by dynamically configuring the workflow configurations based on the update.

7. The system as claimed in claim 6, wherein the workflow management module is further configured to: automatically update a work list of the updated stakeholders with the actions to be performed for each of the list of transactions at each of the multiple levels.

8. The system as claimed in claim 6, wherein the workflow management module is further configured to:
   populate each of the list of transactions with the dynamically updated stakeholders.

9. The system as claimed in claim 6, wherein the list of transactions in the workflow at the multiple levels are fetched from a workflow table using a hash map upon receiving the update in the workflow configuration.

10. The system as claimed in claim 6, wherein the workflow management module is further configured to:
   alert the updated stakeholders with the actions to be performed on each of the list of transactions.

11. One or more non-transitory machine readable information storage mediums comprising one or more instructions which when executed by one or more hardware processors causes to perform a method for dynamically managing workflow configurations, wherein the method comprising:

receiving an update in at least one workflow configuration from a number of workflow configurations associated with an organization;

fetching a list of transactions in the at least one workflow at multiple levels upon receiving the update in the workflow configuration, wherein the workflow comprises the list of transactions at the multiple levels and a list of stakeholders associated with the list of transactions;

executing a plurality of clauses at each of the multiple levels to determine a set of eligible stakeholders for performing the list of transactions and corresponding actions, wherein each of the plurality of clauses are decision control points configured at each of the multiple levels wherein a configuration of each clause is defined based on a pre-condition configured at the clause, wherein executing the plurality of clauses at each of the multiple levels comprises:

fetching the plurality of clauses configured at each of the multiple levels from a workflow table;

executing the precondition for each of the plurality of clauses, wherein the precondition is a condition to decide whether each of the plurality of clauses is to be executed or not to compute next level of the workflow;

determining a clause to be executed from the plurality of clauses upon executing the precondition; and determining a set of stakeholders tagged to the determined clause, wherein the set of stakeholders comprises a group of user identities and wherein the user identities are involved stakeholders based on the received update, wherein the configuration of the plurality of clauses based on the precondition configured at each of the clause enables dynamic configuration of the workflow based on the update without changing entire workflow; and dynamically updating the list of stakeholders and corresponding actions for each of the list of transactions at the multiple levels based on the set of eligible stakeholders for performing the list of transactions and corresponding actions, thereby managing the number of workflow configurations associated with the organization by dynamically configuring the workflow configurations based on the update.

12. The one or more non-transitory machine readable information storage mediums of claim 11, wherein the one or more instructions further causes:

automatically updating a work list of the updated stakeholders with the actions to be performed for each of the list of transactions at each of the multiple levels.

13. The one or more non-transitory machine readable information storage mediums of claim 11, wherein the one or more instructions further causes:

populating each of the list of transactions with the dynamically updated stakeholders.

14. The one or more non-transitory machine readable information storage mediums of claim 11, wherein the list of transactions in the workflow at the multiple levels are fetched from a workflow table using a hash map upon receiving the update in the workflow configuration.

15. The one or more non-transitory machine readable information storage mediums of claim 11, wherein the one or more instructions further causes:

alerting the updated stakeholders with the actions to be performed on each of the list of transactions.

16. The method of claim 1, wherein updating any change in organization requirement for the workflow configuration only requires setting of a rule and a coded class to update the workflow configuration.

* * * * *